(12) United States Patent
Hayashi et al.

(10) Patent No.: US 9,952,758 B2
(45) Date of Patent: *Apr. 24, 2018

(54) METHOD AND MOBILE TERMINAL DEVICE FOR MAPPING A VIRTUAL USER INPUT INTERFACE TO A PHYSICAL USER INPUT INTERFACE

(71) Applicant: Conversant Wireless Licensing S.a.r.l., Luxembourg (LU)

(72) Inventors: Sawako-Eeva Hayashi, Tokyo (JP); Olaf Joeressen, Meerbusch (DE)

(73) Assignee: Conversant Wireless Licensing S.a.r.l., Luxembourg (LU)

( * ) Notice: Subject to any disclaimer, the term of this patent is extended or adjusted under 35 U.S.C. 154(b) by 929 days.

This patent is subject to a terminal disclaimer.

(21) Appl. No.: 14/292,903

(22) Filed: May 31, 2014

(65) Prior Publication Data

US 2014/0281953 A1 Sep. 18, 2014

Related U.S. Application Data

(63) Continuation of application No. 11/908,759, filed as application No. PCT/IB2005/000799 on Mar. 23, 2005, now Pat. No. 8,775,964.

(51) Int. Cl.
*G06F 3/048* (2013.01)
*G06F 3/0487* (2013.01)
(Continued)

(52) U.S. Cl.
CPC ........ *G06F 3/0487* (2013.01); *G06F 3/04883* (2013.01); *G06F 3/04886* (2013.01);
(Continued)

(58) Field of Classification Search
CPC .... G06F 8/34; G06F 3/04847; G06F 3/04886; G06F 3/0487; G06F 3/04883; G09G 2340/145

See application file for complete search history.

(56) References Cited

U.S. PATENT DOCUMENTS 5,939,554 A * 8/1999 Sibi ........................ C07C 227/18
548/215
6,615,299 B1 * 9/2003 Chu ........................ G06F 3/023
463/36

(Continued)

*Primary Examiner* — Rashawn N Tillery
(74) *Attorney, Agent, or Firm* — Conversant Wireless Licensing

(57) ABSTRACT

The present invention provides a method an a device for mapping a virtual user input interface to a physical user input interface. The method is provided for mapping a virtual user input interface to a physical user input interface on a mobile terminal device. The mobile terminal device comprises a first physical user input interface, a display and a processing unit being connected to said display and said physical user interface, wherein an application is configured for use with a second user interface. The method of the invention comprises detecting an event indicative of an application to be executed that is configured for use with said second user interface and displaying a virtual user input interface representing said second user input interface on said display. If a a physical user input is received on said first physical user input interface, it is mapping to said displayed virtual user input interface, and displayed as an indication of a virtual input on said displayed virtual user input interface.

17 Claims, 4 Drawing Sheets

(51) Int. Cl.
*H04M 1/2745* (2006.01)
*H04M 1/725* (2006.01)
*G06F 3/0488* (2013.01)

(52) U.S. Cl.
CPC ............... *H04M 1/274525* (2013.01); *H04M 1/274558* (2013.01); *H04M 1/72547* (2013.01); *H04M 1/274508* (2013.01)

(56) References Cited

U.S. PATENT DOCUMENTS

| | | | | |
|---|---|---|---|---|
| 6,704,004 | B1* | 3/2004 | Ostergangrd | H01H 13/83 178/18.11 |
| 6,720,863 | B2* | 4/2004 | Hull | H04M 1/22 340/7.51 |
| 6,797,902 | B2* | 9/2004 | Farage | G06F 3/0202 200/314 |
| 7,160,043 | B2* | 1/2007 | Cheng | G06F 3/0238 200/310 |
| 7,161,587 | B2* | 1/2007 | Beck | G06F 3/02 341/21 |
| 7,194,699 | B2* | 3/2007 | Thomson | G06F 3/04886 345/170 |
| 2002/0029342 | A1* | 3/2002 | Keech | G06Q 20/02 713/184 |
| 2004/0235554 | A1* | 11/2004 | Defrees-Parrott | A63F 3/081 463/17 |
| 2007/0051792 | A1* | 3/2007 | Wheeler | G06F 3/0482 235/375 |

\* cited by examiner

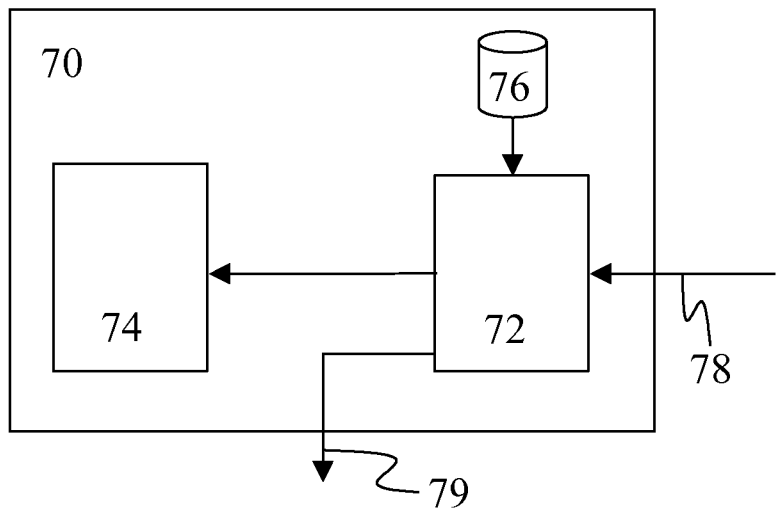

Fig. 5 detecting an event indicative of an application to be executed that is configured for the use with a second user interface, 200 displaying virtual user input interface representing said second user input interface on said display 210 receiving a real user input on said first real user input interface 220 mapping said received real input to said virtual user input interface 230 displaying an indication of a virtual input on said virtual user input interface 240

Fig. 6A

METHOD AND MOBILE TERMINAL DEVICE FOR MAPPING A VIRTUAL USER INPUT INTERFACE TO A PHYSICAL USER INPUT INTERFACE

CROSS REFERENCE TO RELATED APPLICATION

This application is a continuation of US Publication No. 2008/0288878 (U.S. application Ser. No. 11/908,759 filed Mar. 11, 2008) which is a national stage application of PCT Publication No. WO 2006/100540 (PCT Application No. PCT/IB05/00799 filed Mar. 23, 2005), the entire disclosures of which are incorporated herein by reference.

BACKGROUND

The present invention relates to the problem of design and user input interface changes in different computerized devices. Further, the invention relates to a method and terminal device for mapping a virtual user input interface to a physical user input interface. The invention is also related to the compatibility of applications (games and other applications running on e.g. mobile phone terminals, personal digital assistants and the like) on different types/generations of terminals these applications are executed on.

Up to now new computer terminals or mobile terminal devices have only been expanded in their user interface, i.e. new buttons (or other user input elements) have been implemented on the user inter face. For example the second generation Playstation™ controllers are provided with additional "thumbsticks", an analogue key to activate the analogue operation of the buttons and an LED (light emitting) to indicate this analog operation of the input devices.

Similarly the evolution of standard "qwerty-" computer keyboard allowed different implementations of additional hot-, shortcut and functions keys for certain applications such as e.g. keys for controlling multimedia applications, or calling the pocket calculator application and the like.

Virtual keyboards, being non-physical, essentially require a means to be fed with input utilizing a method which enables mapping of the virtual keyboard to intended input. Currently the combination of a pen user interface for controlling the virtual keypad with a device-accessory pen via a touch screen is the standard solution for example for PDAs and Palmtop PDAs. In these cases the change of the touchscreen user interface happens rarely.

Up to now no downward compatible devices with significantly different designed user input interfaces have been implemented as can be seen on the not very user friendly qwerty computer key board with its slightly displaced key rows that can be traced back to the mechanical typewrites.

It is therefore desirable to enable a designer to significantly change the design of a user input interface without the restrictions of traditional and conventional input interfaces, while enabling downward compatibility.

It is also desirable to provide a good usability for applications (such as game applications) even if the device the application is executed on has a different set of input interfaces (keys/controls) (e.g. game controls instead of a phone keypad)

It is further desirable to provide a possibility to avoid virtual keypads with a low usability.

It is further desirable to provide a user interface, which enables a user to understand the different functionalities of the application control possibilities with different types of keyboards or user input interfaces quickly.

It is also desirable to eliminate the constraints of strictly downward compatible designed user interfaces to provide downward compatibility of the user input to mobile terminal devices.

It is also desirable to improve the usability of virtual keyboards by providing an intuitive input method to a virtual keyboard on mobile terminal devices.

It is desirable to increase the usability of virtual keypads for gaming applications that are unable to offer a non-arbitrary mapping for game control keys (such as shoulder keys, action keys, joysticks, etc.).

It is also desirable to prevent that a user has to learn a new mapping separately for each application executed on a downward compatible mobile terminal device if the mapping depends on each application.

According to a first aspect of the present invention, there is provided a method for mapping a virtual user input interface to a physical user input interface on a mobile terminal device. The method is intended to be executed or performed on a mobile terminal device having a first physical user input interface, a display and a processing unit being connected to said display and said physical user interface. The mobile terminal device is capable of executing applications that are configured for the use with a second user interface (that is not provided on or is not ready at said mobile terminal device). It is further expected that said second user input interface not being completely included in said first physical user input interface, i.e. the first physical user input interface is not just the second user input interface extended by a number of additional buttons or input elements.

The method comprises the steps of detecting an event indicative of an application to be executed that is configured for the use with a second user interface, displaying a virtual user input interface representing said second user input interface on said display, receiving a physical user input on said first physical user input interface, mapping said received physical input to said virtual user input interface, and displaying an indication of a virtual input on said virtual user input interface.

It is to be noted that this method may be implemented on said mobile terminal device by a program or an adaptation software for adapting the user output interface to the format and properties of the second device.

This basic embodiment is provided to enable a fast and simple learning of a new control interface of a new mobile terminal to enable a downward compatibility to devices with a different user interface.

It should be noted that said second user interface may also be provided on a mobile terminal device. For example, an advanced foldable mobile phone/gaming device having a set of different operation modes including e.g. a closed phone mode with a small user interface, and an open gaming mode with a large user interface. The device could be equipped with two displays of different sizes; a large screen for gaming, and a smaller one for phone functionality. The device can operate so that it provides an enhanced gaming experience when functioning in the gaming mode. However it is more compact and easier to handle, when the device is in the phone mode. The virtual user input interface can be mapped with physical input elements to realize mapping of enhanced gaming input methods, when the device is operating with the smaller display.

In an example embodiment of the present invention the method further comprises starting said application and using said mapped input as an input to control said application after the application has been started. This enables a user to use a depicted virtual user interface to control an application. In this special embodiment the application may not require any display output (such as in case of a sound or audio application).

In another example embodiment of the method of the present invention said event indicative of an application to be executed that is configured for the use with a second user interface, is a user input. The user input may comprise e.g., the calling for the activation of this application. It is also envisaged to use the present invention as an extension to a "help" menu point to assist a user in comprehending the input functionality of a device with an amended user interface.

In yet another example embodiment of the method of the present invention said event indicative of an application to be executed that is configured for the use with a second user interface, is a detection of a connected memory card. In this case the mobile terminal device further comprises an extension memory card slot for receiving a software or software modules stored on an interchangeable memory module. The concept of software stored on interchangeable memory modules is for example known from gaming consoles. The device may use e.g. a time information on said memory module to determine if the mapping is to be activated and the virtual user input elements are to be displayed or not.

In another example embodiment of the present invention said method further comprises displaying a virtual display content related to the operation of said application or to said virtual user input interface on said display. This feature enables the use of the virtual input elements while a demo version of an application is executed to support the learning process of a user. This feature can provide the virtual input elements while the application is executed, which is especially useful if the virtual display occupies only a part of the display area of the physical display. The unoccupied areas of the physical display may serve to indicate the virtual display in operation.

In yet another example embodiment of the method of the present invention said indication of a virtual input on said virtual user input interface comprises highlighting an "operated" virtual user input interface element. This highlighting may be done by a virtual key or input element illumination. That is, a light can be used to indicate actuated virtual input elements. Highlighting can indicate especially the actuation of buttons and keys. The highlighting may be varied in color to indicate a combined input or an activated second function key (such as e.g. the known "shift key"). It is also envisaged to highlight the activated second-function key with a first color and to indicate the other available input options on the virtual user input interface with a different second color, to give hints to the user. It is also contemplated to highlight the activated virtual second-function key with a first color (e.g. yellow) and to indicate the other available input options on the physical user input interface (with e.g. blue), to give hints to the user.

It is also taken into consideration that the physical user interface is provided with individual interface element illuminations that can be operated with different colors. This feature would allow a user to recognize the mapping function instantaneously, if the correlated physical input elements and the virtual input elements are illuminated or displayed in the same color. This may be simplified if a set of colors is used for each side of the user input interfaces. In this configuration input can be indicated on the virtual input interface by an increased intensity or brightness.

In another example embodiment of the method of the present invention said indication of a virtual input on said virtual user input interface comprises moving an "operated" virtual user input interface element. Moving in this context means the motion of a virtual user interface element on said display. This application is especially useful in connection with virtual joystick input elements to indicate the direction of a performed and mapped user input. In case of physical input elements provided with force feedback actuators it may be envisaged to indicate the mapping by synchronously and individually moving mapped physical input elements and virtual input elements simultaneously and synchronously.

Another example embodiment of the method is executed on a mobile terminal device, wherein said first physical user input interface is the input interface of said mobile terminal device and second user interface is an interface of another mobile terminal device. This application is useful if a device can execute an application while emulating another device.

In just another example embodiment the method further comprises retrieving said virtual user input interface from an internal memory of said terminal device. The invention is related to the downward compatibility of a mobile terminal device such as a gaming device, a cellular telephone or a mobile game phone. Due to the downward compatibility it could be expected that the data required for displaying said virtual user input interface is not provided by the application or a software module (that has been designed for an older device) but by the terminal device itself. These data may be stored in a proprietary memory module in said mobile terminal device for example in a mapping data base provided in said terminal device. It is also contemplated to use e.g. storage space on an interchangeable memory module to store the mapping data and data for generating the virtual user input interface.

In yet another example embodiment of the invention the method further comprises determining the second user interface said application is configured for, and retrieving a matching virtual user input interface accordingly. This embodiment is provided to use different user interfaces of different types of antecessor devices. This can be used, if the input interface design is significantly changed twice in three generations of devices, or if the device is downward compatible to different antecessor devices.

In another example embodiment of the method of the present invention said virtual user input interface is retrieved from a remote server via a wireless communication connection. In the case of the above implementations the capability to access different types of virtual user input data may be used to emulate even devices that have not been intended to be emulated on said mobile terminal device. The data communication connection may use a cellular phone data transmission technology such as e.g. GPRS (of GSM) or a respective system of e.g. UMTS. The data communication connection may also comprise a connection via Internet.

In still another example embodiment of the present invention the method further comprises displaying a text descriptive of the functionality of said user input on said display. The present invention is generally only useful for people who have used a certain application on an antecessor model of the mobile terminal. The benefit for people not having used the old version on the old model the benefit is restricted to an adaptation of application help files that refer to the original second user input interface. When indicating a textual description of the functionality of the actually received user input by pressing a key, any user can simply recognize not only the correlation forming the basis of the mapping but also the functionality of this key in the application.

This functionality due to the mapping operation is the same for the received physical user input and for the mapped and indicated virtual user input.

According to yet another aspect of the invention, a software tool is provided comprising program code means for carrying out the method of the preceding description when said program product is run on a computer or a network device.

According to another aspect of the present invention, a computer program product downloadable from a server for carrying out the method of the preceding description is provided, which comprises program code means for performing all of the steps of the preceding methods when said program is run on a computer or a network device.

According to yet another aspect of the invention, a computer program product is provided comprising program code means stored on a computer readable medium for carrying out the methods of the preceding description, when said program product is run on a computer or a network device.

According to another aspect of the present invention a computer data signal is provided. The computer data signal is embodied in a carrier wave and represents a program that makes the computer perform the steps of the method contained in the preceding description, when said computer program is run on a computer, or a network device.

Preferably the computer program and the computer program product are distributed in different parts and devices of the network. The computer program and the computer product device run in different devices of the network. Therefore, the computer program and the computer program device have to be different in abilities and source code.

According to yet another aspect of the present invention a mobile terminal device is provided that is capable of mapping a virtual user input interface to a physical user input interface. The mobile terminal comprises a physical user input interface, a display and a processing unit. Said processing unit is connected to said display and said physical user interface.

The mobile terminal device is also provided with a mapping module and a mapping database. The mapping module is connected to said processing unit and to said physical user input interface and said mapping database is connected to said mapping module.

The processing unit is capable of executing applications that are configured for the use with another second user interface. Said processing unit is further configured to detect that an application is to be executed that is configured for the use with said second user interface.

Said mapping module is configured to display a virtual user input interface that represents said second user input interface on said display. Said mapping module is further configured to map a received physical input to said virtual user input interface and display an indication of a virtual input on said virtual user input interface on said display, if a physical user input is received on said first physical user input interface. Said mapping database is configured to store data such as (second virtual) user interfaces or mapping relations or even application identifications required for the mapping process.

The expression "physical user input interface" has been selected to be able to clearly differentiate between a virtual and a physical user interface. The physical user input interface can comprise user input elements such as buttons, keys, joysticks, coolie-hats, trigger buttons, shoulder keys, wheels or sliders, dials, turning knobs and the like.

For the sake of clarity and conciseness a power supply such as a battery pack or components such as display driver modules and memory modules in the terminal device have been economized.

The mapping module may be embodied as a section in said processing unit and the mapping database may be embodied as a section of a memory module provided in said terminal device.

In another example embodiment of the present invention said mobile terminal device is further provided with a cellular telephone module. This embodiment is directed to an implementation of the present invention in a mobile cellular game phone, a combination of a mobile gaming console and a mobile telephone. Especially in this embodiment a change of the user interface for new game concepts provides a wide application area for the mapping concept of the present invention.

In yet another example embodiment of said mobile terminal device said display is a touch-screen display. Touch-screen displays have a wide variety of different applications for additional input features. This special feature may be used to provide also the "inverse" implementation of the present invention. The inverse implementation could be used if e.g. the physical user input elements are provided with individual illumination elements, by highlighting the physical user input element on the terminal device, if a user touches a virtual input element of the second user input interface. It is also possible that a user uses the touch-screen itself (or the depicted user interface) as well as a normal virtual user interface. This implementation enables a user to choose between a real user interface and the virtual user interface for performing user input. The depicted virtual input interface and the real user interface enable the user to use e.g. both input interfaces simultaneously, e.g. the thumb-stick with the right hand and the virutual input interface with the rigth hand for performing user input.

In still another example embodiment of the present invention the terminal device is further provided with an interface for receiving memory modules that is connected to said processing unit. By using memory modules the device of the present invention can use the method of the present invention with applications that are stored on interchangeable memory devices. This embodiment is usable for hard coded game application memory modules used for portable gaming consoles.

BRIEF DESCRIPTION OF THE DRAWINGS

In the following, the invention will be described in detail by referring to the enclosed drawings in which:

FIG. 5 shows a block diagram mobile user terminal having the capability of mapping a first physical user input interface to a second virtual user interface, and FIGS. 6A and 6B show flowcharts two different embodiments of method of the present invention.

Figure 1:
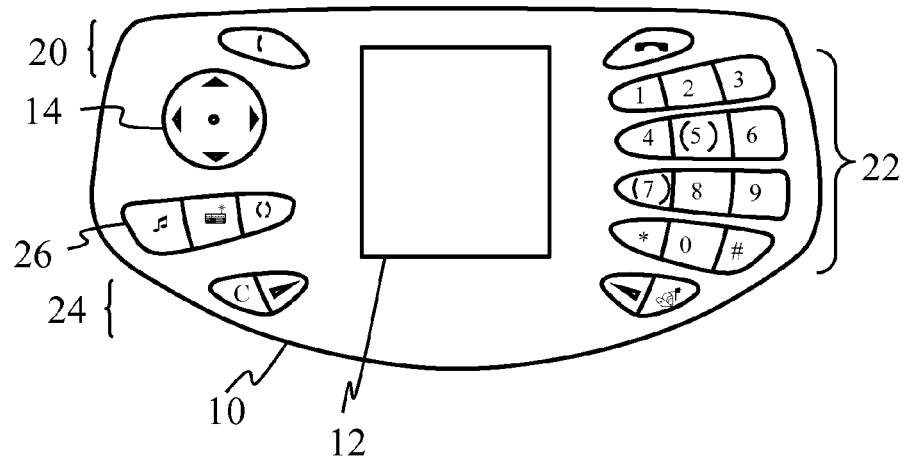
FIG. 1 is schematic diagram of a second mobile terminal device having a second user interface.

In the detailed description that follows, identical components have been given the same reference numerals, regardless of whether they are shown in different embodiments of the present invention. In order to clearly and concisely illustrate the present invention, the drawings may not necessarily be to scale and certain features may be shown in somewhat schematic form.

DETAILED DESCRIPTION

In the following the first device is the device of the present invention and the expression "second device" is exclusively used for devices and components to be virtually recreated on the first device. It is expected that the second device is an older model to be replaced by said first device.

FIG. 1 is schematic diagram of a second mobile terminal device 10 having a second user interface. The second physical user interface comprises a small physical portrait format display 12, a physical four-way rocker key 14, other input elements such as the phone cradle keys 20, the ITU-T keypad 22, menu keys 24 and hotkeys 26 for operating the second mobile terminal device 10.

The hardware of such kind of terminal (especially input elements (keys, joysticks . . . ) and the display (size, resolution . . . ) changes usually from one device generation to the next. Mobile game terminals (such as mobile game devices) of an earlier version may contain a small display in the middle, a 4- or 8-way joystick left to the display and an ITU-T keypad on the right side of the display, like for example the depicted Nokia G-Gage™ type gaming terminal. A later version of such a game terminal might comprise a larger display that may be equipped with a touch screen and another arrangements of keys as user input elements.

Figure 2:
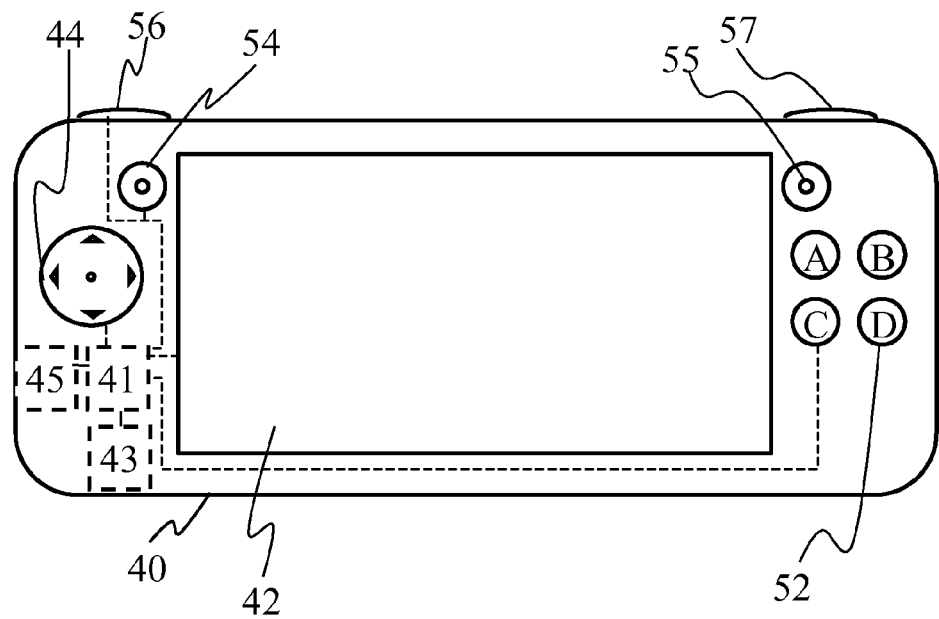
FIG. 2 is schematic diagram of a first mobile terminal device having a first user interface.

FIG. 2 is schematic diagram of a first mobile terminal device 40 having a first user interface. In contrast to the second interface of the second terminal device the first mobile terminal device has a significantly changed interface comprising a large landscape format display 42, a big thumb operated joystick or thumbstick 44, four function buttons A-D 52, two 4-way mini-joysticks 54, 55 and two shoulder keys 56 and 57. It is visible that a one-to-one mapping function that may be understood intuitively may not be possible when an application designed for the second device should be executed on a down compatible first device with a significantly changed user input interface.

The device further comprises a processing unit 41, connected to the user-input interfaces 42, 44, 52, 54, 55, 56, 57 (not all connection depicted), an internal memory unit 43. A memory slot is also depicted for the connection of memory modules with application program software components that may be designed for a non-present user input interface.

If a user of the second terminal device has purchased for example many games, e.g. on MMC cards for this device and wants to upgrade to the new device and use the old applications, play the old games on the new device the user faces the problem, that the new terminal does not have the same input elements. Especially in the case that the first device does not only have an increased number of input elements and different input elements which are used on the new (first) terminal for playing one of the games of the second device.

The present invention offers a simple solution for this problem. The first device of the next generation is aware of the way how applications/games were controlled on a second device (e.g. an earlier version of this terminal) and simulates the earlier version in some respect or teaches the user how to operate the old application on the first (new) terminal.

Figure 3:
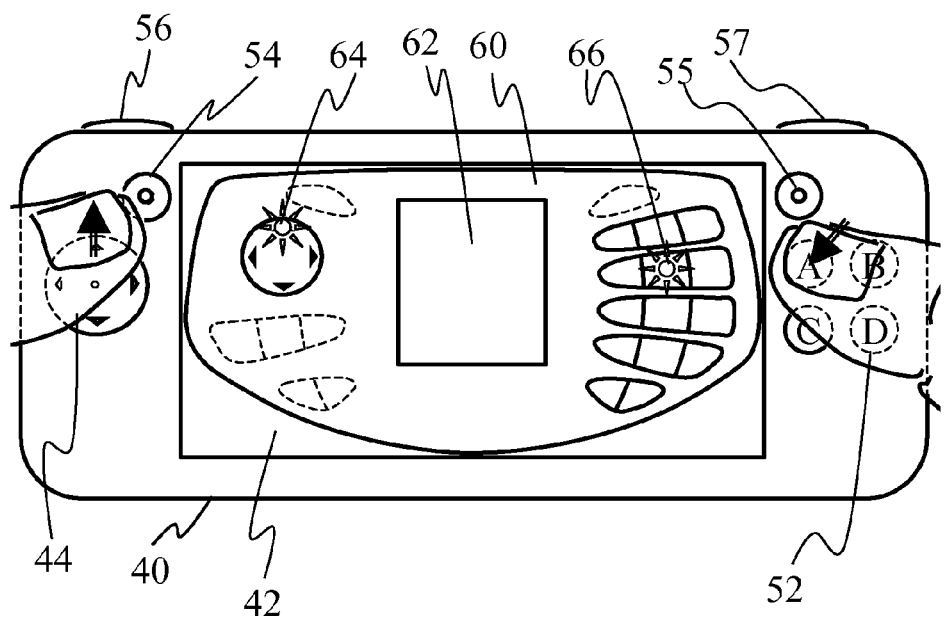
FIG. 3 is schematic diagram of a mobile user terminal device having a first user interface, with a depicted second user interface.
Figure 4:
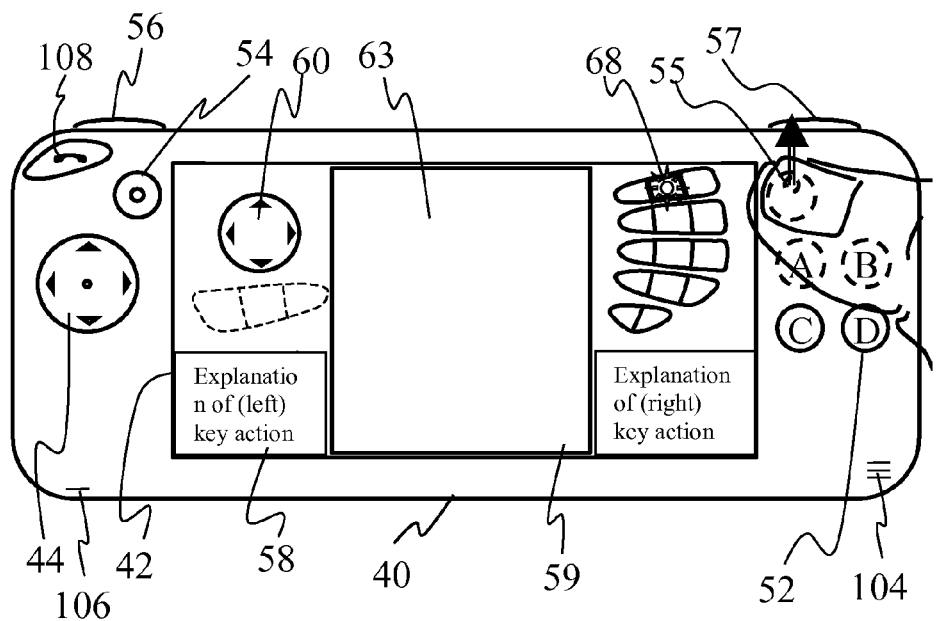
FIG. 4 is another schematic diagram of a mobile user terminal device having a first user interface, with a depicted second user interface.

The invention might be best understood based on the FIGS. 3 and 4. Virtual keypads are very intuitive but have bad usability (especially for gaming applications). If a user input device (e.g. a game controller), the application is designed for, does not have an obvious mapping to the input device of the present terminal the user may be very frustrated if it is not intuitively possible for the user to use the application of playing a game on a new terminal (or a new portable gaming console). This leads to frustrated users especially if different applications (e.g. games) use different input set up configurations. In case of in a plane simulation applications this leads to frustrated users thrumming on a certain button while e.g. a cannon and the rockets keep on not firing, while the weapons are perpetually selected and the target selection keeps jumping over the HUD (head up display) or the gear and the speed breaks keep moving in and out. This is even more annoying if a user has to move in similarly appearing game environments such Lara™ and Ashen™, leading to slow learning, and bad end user gaming experience.

To simplify the re-education of a user to the new user input interface the old application is executed or shown in a window (as a virtual display) 62 on the display 42 of the first device. Additionally the user input interface of the second device with the old keys/controls is shown as virtual keys on the display. The display 42 may (not necessarily but beneficially) be embodied as a touch-screen.

The default mappings between the actual user input interface (keys and the old set of keys/controls) are in the device for existing content. These mappings may be dependent on an actual content or application or on a future content or application. The application protocol interfaces (APIs) can be defined to let the application configure mappings.

The key component of the present invention is that whenever an actual (active or configured input element e.g.) input key (or a combination of input elements) is pressed, the corresponding virtual key on the virtual keypad is highlighted such that the mapping is obvious for the user and correspondence to user manuals, and help pages may further be offered to the user.

In FIG. 3 a user presses the "A"-key on the right hand side with the right thumb, as indicated by an arrow. The respective key 55 on the virtual keypad on the screen 42 is highlighted accordingly. A user also moves the thumbstick 44 forward on the left-hand side with the left thumb, as also indicated by an arrow. The respective virtual four-way rocker key 64 on the virtual device on the screen 42 is also highlighted accordingly.

It is obvious that with the present invention the structure of the mapping between the new input elements of the first device to the former input elements of a second device is easily comprehensible for a user.

That is, the first terminal 40 of the next generation is aware of the way how applications/games were controlled on (earlier versions of this) second terminal 10 and simulates the earlier version in some respect or it teaches the user how to operate the old application on the new terminal.

The mobile terminal device 40 maps a virtual keypad and actual keys 44, 52, 54, 55, 56, 57 on the device 40 so that whenever an actual key and/or key combination 44, 52, 54, 55, 56, 57 is pressed, the corresponding key 64, 66 on the virtual keypad is highlighted such that the mapping is obvious to the user. Virtual keyboard movements for four directions (up, down, right, left) 60 could be mapped to the movements of device-inherited joystick 44, and as user chooses a direction, the corresponding key is selected and highlighted 64 as illustrated in FIG. 3.

This enables a user to comprehend and learn the mapping faster than without this feature. This concept can be applied to different combinations of virtual keyboards and various physical input devices. It is for example suitable for small ¼-size keyboards for palmtops that are provided with 2 "shift keys" to select the quarter of a full-size qwerty-keyboard the ¼-size keyboards should serve. Additionally the present invention may be used to simplify the usage of multifunctional keyboards with many different functionality components of most of the keys.

In case of a game application the depicted virtual input interface provides an enhanced gaming functionality even when user is on the move. For example, an advanced mobile gaming device comprises a set of different operation modes including e.g. a phone mode and the gaming mode. The device is also equipped with two displays of different sizes; a bigger screen for gaming, and the smaller one for phone functionality. The device may operate so that it provides an enhanced gaming experience when functioning in the gaming mode. However, the device is more compact and easier to handle, when the device is in the phone mode. The idea of a virtual keypad mapped with physical input elements may also be applied for depicting the enhanced gaming input elements to a virtual representation in the smaller display when the device is operating with the smaller display and with the telephone input interface elements.

FIG. 4 depicts an implementation of the present invention wherein the terminal device 40 is also provided with mobile telephone components and mobile telephone functionality. The mobile terminal device is provided with a microphone 106, an earpiece 104 and a cradle button 108 to provide telephone operability. The internal components of the device such as SIM-card holder and receiver/transmitter elements are not depicted for not obscuring the description.

In contrast to FIG. 3 the input element of a mini joystick 55 can not directly and intuitively be mapped to the keys of the virtual ITU-T keyboard depicted on the screen 42. There are different possibilities to map the (at least 4) input options to the ITU-T keyboard, especially in combination with the four "ABCD" keys on the right hand side of the terminal device 40. The same applies to the two shoulder keys 56, 57. It may be possible to map these keys to the keys 1 and 3 (see FIG. 1) of the virtual ITU-keypad to provide e.g. an input for a step to the side of an adventure game. In addition to the embodiment of FIG. 3 the highlighted key 68 on the virtual keypad is also indicted by a broad bordering to indicate that the key has been pressed or that the key has moved.

It is for example envisaged to implement the present invention as a smart-phone which, provides standard phone functionality (with a small keypad) and has also a second large display with respective user interfaces for providing a gaming capability. If a game that is compatible with the smart-phone but was originally created for a previous version of the same smart-phone product line, this older generation device had a rather different set of input devices which are replaced in the new smart-phone. For games made for the older device to run and be able to be controlled properly on the new one, there should be a means for providing the set of old input elements or method on the new device.

It is an alternative solution to emulate a virtual keypad by software for providing the known interface to provide a known input interface to a user on a new device with different input interface elements.

If the new device has a larger physical display than the previous device, and a game for the previous device leaves a considerable amount of unoccupied space on the screen, if the game is executed without a re-scaling. Additionally the device may have a display with another format (portrait/landscape) so that even with re-scaling an unoccupied space is on the screen.

In FIG. 4 the virtual screen 63 has been re-scaled to a larger format to achieve a richer gaming experience on the bigger screen (as compared to FIG. 3). The increased size of the virtual display 63 requires to reduce the displayed size of the virtual keypad on the right side of the display. Additionally, two text boxes 58 and 59 have been introduced to indicate the functionality of the pressed keys or actuated input elements. This feature may simplify the use of downward compatibility of the device significantly. The device 40 provides an image of virtual keyboard taking advantage of the unused display space. It is envisaged to provide an arbitrary mapping in which user has to learn each key mapping without a logical connection between the virtual key to be handled and the physical user input interface elements.

Instead of a software-based virtual keypad with pen input, the invention provides a mapping, which improves awareness of the user of relation between the virtual input interface and a physical input interface provided on the device. Assuming that the device has 5-way direction keys (top, down, right, left, and center), the virtual map can also have the shape and appearance similar to the physical direction keys, and its functionality can be mapped to functionality of the corresponding physical keys.

FIG. 5 shows a partial block diagram of a mobile user terminal having the capability of mapping a first physical user input interface to a second virtual user interface. The box 70 represents the emulation of a second device on a first device. The box 74 represents a piece of software or an application module 74 such as e.g. a gaming application provided for the emulated second device. The emulated application expects and requires the input of the standard user input interface of the second device (which is actually not provided on the first device). A mapping module 72 is implemented to provide the required input to the application module 74. To achieve this, the mapping module 74 or key mapping module can receive a respective data from a mapping database 76 provided for application mapping. The content of the mapping data base may be provided in the first device or may be downloaded for each application separately from a data communication network. It is expected that later embodiments of applications may provide this functionality in the application or in the application module, especially if the application device is designed for dual use in the first and the second device with or without the mapping functionality. The mapping database 76 can also comprise the data required for depicting the virtual keypad on a display. It may be noted that these display data may also be application dependent, according to the number of keys that have to be used to run the application of the second device.

With the mapping data and the interface data the mapping module 72 can translate received input 78 (as indicated by the arrow) in the first device to the input structure of the second device to operate the application module 74 accordingly.

The mapping module 72 can use the interface data to display the virtual user input interface of the second device on the first device, and highlight operated virtual input elements accordingly as indicated by the arrow 79.

FIG. 6A shows a flowchart of an embodiment of method of the present invention. The method starts with detecting 200 an event indicative of an application to be executed that is configured for the use with a second user interface, that is not provided or available on the device. The method continues with displaying 210 a virtual user input interface representing said second user input interface on a display of the device. In a next step a physical user input is received 220 on said first physical user input interface. The device maps 230 said received physical input to said virtual user input interface and displays 240 an indication of a virtual input on said virtual user input interface.

Figure 6B:
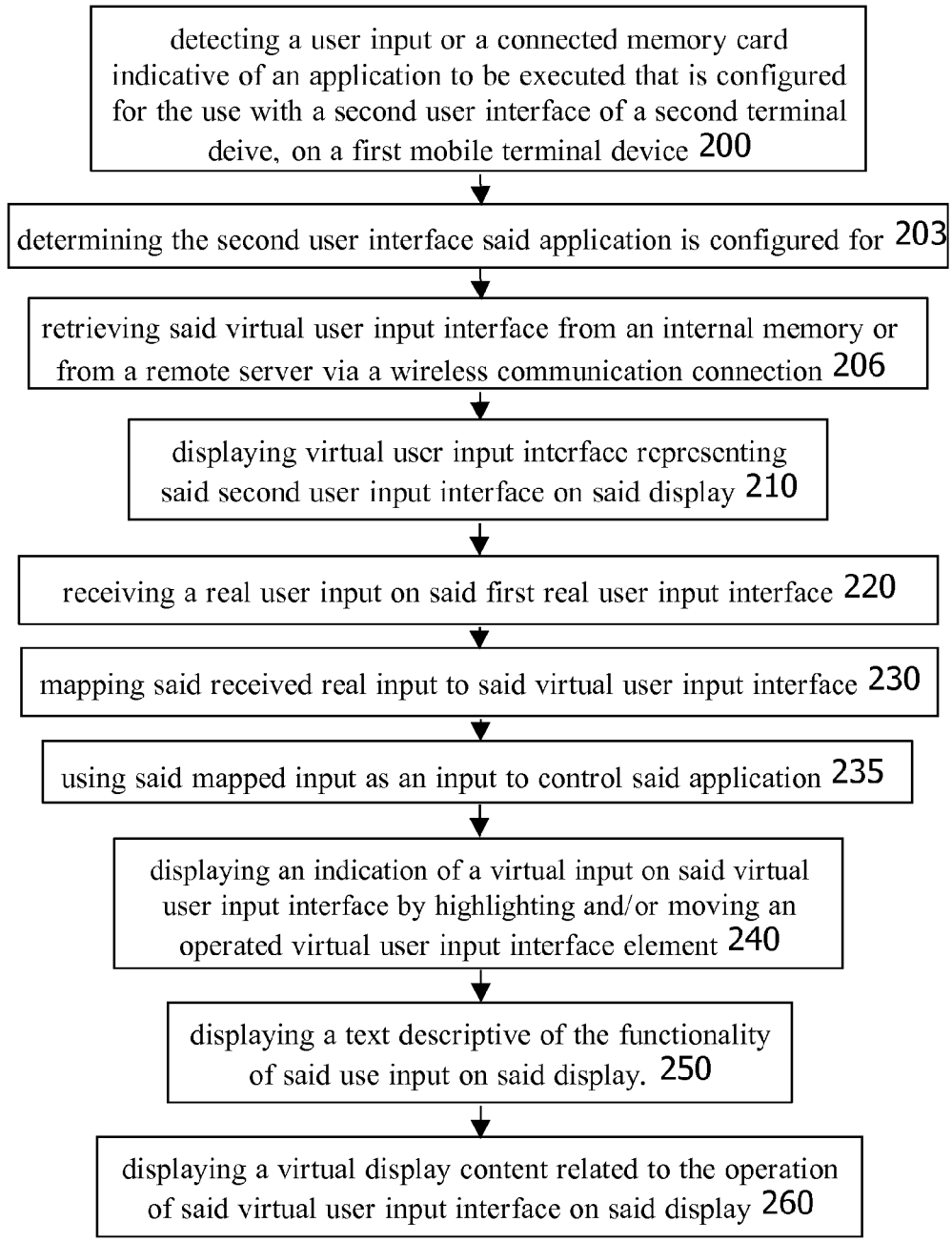

FIG. 6B shows another flowchart of an embodiment of method of the present invention. In the extended method depicted in FIG. 6B the detecting 200 of an event indicative of an application to be executed that is configured for the use with a second user interface of a second terminal device is performed on a first mobile terminal device by receiving a user input or by detecting a connected memory card.

In FIG. 6B a dedicated step is provided for determining 203 the second user interface said application is configured for. Subsequently, this is followed by retrieving 206 a virtual user input interface corresponding to said second user interface from an internal memory or from a remote server via a wireless communication connection. The retrieved virtual user input interface representing said second user input interface is then displayed 210 on said display.

If the physical user input is received 220 on said first physical user input interface; it is mapped to said virtual user input interface 230. This mapped input is used to control 235 said application designed for said second user input interface.

Finally an indication of a virtual input is displayed 240 on said virtual user input interface by highlighting and/or moving an operated virtual user input interface element.

For supporting the understanding of the user a descriptive text describing the functionality of said input is displayed 250 on said display.

Finally in addition to the virtual input interface a virtual display content related to the operation of said virtual user input interface or to said application is displayed 260 on said display.

The invention improves the usability and user-friendliness of virtual keypads by facilitating intuitiveness of the input method taking an advantage of resemblance in appearance and functionality between the virtual keypad and the actual device input elements.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

What is claimed is:

1. A method comprising:
configure, for execution in a mobile device, which includes a physical user input interface, an application that is originally configured for execution using a virtual user input interface;
displaying the virtual user input interface on a touchscreen display of the mobile device, wherein the physical user input interface is mapped to the virtual user input interface;
receiving a physical user input on the physical user input interface while simultaneously receiving an input through the virtual user input interface on the touchscreen display;
mapping the receiving physical input to the displayed virtual user input on the touchscreen display; and
determining to display an indication of a virtual input, based on the received physical input, on the displayed virtual user input interface while executing the application on the mobile terminal device based on the received input from both the physical user input interface and the virtual user input interface.

2. The method of claim 1, further comprising, when executing the application on the mobile terminal device, using the mapped input as input to control the application.

3. The method of claim 1 further comprising executing the application on the mobile device using the virtual user input interface as input to control the application.

4. The method of claim 1 further comprising executing the application on the mobile device using the physical user input interface as input to control the application.

5. The method of claim 1 further comprising indicating an input on the virtual user input interface through simultaneous illumination of a color on both the interface element on the virtual user input interface and an illumination element of the physical user input interface.

6. The method of claim 1 further comprising illuminating at least one illumination element of the physical user input interface based on the mapping when the user provides an input through the virtual user input interface.

7. The method of claim 1 further comprising indicating an input on the physical user input interface through simultaneous illumination of a color on both the interface element on the virtual user input interface and an illumination element of the physical user input interface.

8. The method of claim 1 further comprising indicating an input on the physical user input interface through force feedback at the physical user input interface and illumination of a color on the virtual user input interface.

9. A computer-readable storage medium carrying one or more sequences of one or more instructions which, when executed by one or more processors, cause an apparatus to at least perform the following steps:
configure, for execution in a mobile device, which includes a physical user input interface, an application that is originally configured for execution using a virtual user input interface;
display the virtual user input interface on a touchscreen display of the mobile device, wherein the physical user input interface is mapped to the virtual user input interface;
receive a physical user input on the physical user input interface while simultaneously receiving an input through the virtual user input interface on the touchscreen display;
map the receiving physical input to the displayed virtual user input on the touchscreen display; and
determine to display an indication of a virtual input, based on the received physical input, on the displayed virtual user input interface while executing the application on the mobile terminal device based on the received input from both the physical user input interface and the virtual user input interface.

10. The computer-readable storage medium of claim 9, wherein the apparatus is further caused to correlate a motion shown on the virtual user input interface to the physical user input interface such that the physical user input interface provides feedback to the user as the virtual user input interface, simultaneously, provides feedback to the user.

11. The computer-readable storage medium of claim 10, wherein the feedback on the physical user input interface is illumination of a corresponding portion of the physical user input interface.

12. The computer-readable storage medium of claim 10, wherein the apparatus is further caused to use the mapped input as input to control the application when executing the application on the mobile terminal device.

13. A device comprising:
a physical user input interface;
a display;
a processing unit connected to the display and the physical user input interface;
a module connected to the processing unit and to the physical user input interface; and
a memory connected to the processing unit and the module, the memory including mapping information related to a virtual user input interface,
wherein the processing unit is capable of executing applications through input using the virtual user input interface,
wherein the processing unit is configured to detect that an application is to be executed on the device,
wherein the module retrieves mapping information from the memory that includes a virtual user input interface matching the physical user input interface,
wherein the module is configured, with the processing unit, to display the virtual user input interface, which represents the physical user input interface, on the touchscreen display of the device, receiving a physical user input on the physical user input interface while simultaneously receive an input through the virtual user input interface on the touchscreen display, and map the receiving physical input to the displayed virtual user input on the touchscreen display.

14. The device of claim 13 further comprising a cellular telephone module connected to the processing unit for communication with the second device.

15. The device of claim 13, wherein the virtual user input interface includes at least one illumination element that provides illumination feedback, on the display, corresponding to the user's input at the physical user input interface.

16. The device of claim 13, wherein the physical user input interface includes at least one actuator that provides force feedback corresponding to an illumination of at least one illumination element of the virtual user input interface on the display.

17. The device of claim 13, wherein the physical user input interface includes at least one actuator that provides force feedback corresponding to movement of a virtual element of the virtual user input interface on the display.

* * * * *